United States Patent
Imgrüt

(10) Patent No.: US 6,289,573 B1
(45) Date of Patent: Sep. 18, 2001

(54) APPARATUS FOR MAKING UP A CABLE

(75) Inventor: Peter Imgrüt, Horw (CH)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 09/400,684

(22) Filed: Sep. 21, 1999

(30) Foreign Application Priority Data

Sep. 21, 1998 (EP) .................................................. 98810940

(51) Int. Cl.$^7$ .................................................. H01R 43/052
(52) U.S. Cl. .......................... 29/564.4; 29/33 M; 29/748; 29/753
(58) Field of Search .............................. 29/564.4, 33 M, 29/747, 748, 749, 753; 81/9.51

(56) References Cited

U.S. PATENT DOCUMENTS

| 4,084,310 | | 4/1978 | Dragisic . | |
|---|---|---|---|---|
| 4,087,908 | * | 5/1978 | Fusco et al. | 29/753 |
| 4,506,566 | | 3/1985 | Schmid . | |
| 4,554,725 | * | 11/1985 | Over et al. | 29/564.4 |
| 4,612,696 | * | 9/1986 | Talley | 29/564.4 |
| 4,622,733 | * | 11/1986 | Fukuda et al. | 29/748 X |
| 4,713,880 | * | 12/1987 | Dusel et al. | 29/564.4 |
| 4,790,062 | * | 12/1988 | Amir | 28/564.4 |
| 5,025,549 | * | 6/1991 | Hornung et al. | 29/564.4 |
| 5,412,855 | * | 5/1995 | Koch | 29/33 M |
| 5,490,316 | * | 2/1996 | Kimoto | 29/564.4 |

FOREIGN PATENT DOCUMENTS 2 292 327  2/1996  (GB) .

* cited by examiner

Primary Examiner—William Briggs
(74) Attorney, Agent, or Firm—Cohen, Pontani, Lieberman & Pavane

(57) ABSTRACT

Production unit for processing cable ends, wherein the cable ends are trimmed, stripped of insulation and connected to contacts by means of crimp connections. The production unit includes the subassemblies of a gripper unit, a knife head, an ejector, an adjusting device, a contact cutter and a crimping device, wherein the subassemblies are arranged at a housing. The cable end of a cable is manually advanced up to a processing region, wherein a release device establishes the correct position of the cable end and triggers the processing procedure. Improperly connected contacts are separated from the cable by the contact cutter, wherein the gripper unit transports the cable by a rotational movement to the contact cutter.

6 Claims, 4 Drawing Sheets

APPARATUS FOR MAKING UP A CABLE

BACKGROUND OF THE INVENTION

1. Field of the Invention

The invention relates to equipment for making up a cable, consisting of subassemblies for holding fast and processing the cable.

2. Discussion of the Prior Art

Automated machines or semi-automated machines are used for making up and processing cables, wherein in the case of semi-automated machines the cable feed is carried out automatically. The cable ends are mechanically stripped of insulation and subsequently a contact is connected with the cable end by crimping. The cable is laid in by hand and held by a gripper during the processing, wherein the cable is kept in the hand during the short processing time. Further processing steps, such as for example trimming and/or equipping with nozzles or sockets, can be done in similar manner.

The expensive insulation-stripping process and the qualitatively inadequate stripping of insulation from the cable end are unsatisfactory in the known equipment. Insulation which is not fully cut into makes difficult or impossible the following pulling-off step or insulation which is cut into too deeply has the consequence of damage of the conductor strands. Faulty crimp connections are not recognized. Moreover, the costly adjusting work in the case of converting the production equipment to different cables is disadvantageous.

SUMMARY OF THE INVENTION

Here the invention will provide a remedy. The invention meets the object of avoiding the disadvantages of the known equipment and of providing equipment, for making up cables, which improves the manufacture qualitatively and in terms of production. Pursuant to this object, and others which will become apparent hereafter, one aspect of the present invention resides in an apparatus for making up a cable, which includes a gripper unit for holding the cable fast during processing so that the cable is transportable to at least one processing region.

In another embodiment of the invention the gripper unit includes a guide module for guiding the cable and a gripper module with cable grippers for gripping the cable. The cable grippers include two drivable cable gripper jaws.

In another embodiment of the invention the gripper module is vertically displaceable for adaptation to a processing height and/or rotatable about an axis for transportation of the cable. The guide module includes guides for the vertical displacement of the gripper module and drive means for rotating the gripper module about the axis.

In still a further embodiment the apparatus includes a gripping device operative to vertically displace the gripper module and a force storage device that is operatively arranged to reset the gripper module. Preferably, the force storage device is a spring.

The advantages achieved by the invention are substantially to be seen in that the laying in of the cable is simplified and at the same time the triggering of the processing procedure is accelerated. It is further advantageous that faulty crimp connections are recognized and cut off. Moreover, several different processing steps can be carried out by the same subassembly, which in turn has a cost-reducing effect on the manufacturing costs of the production equipment.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
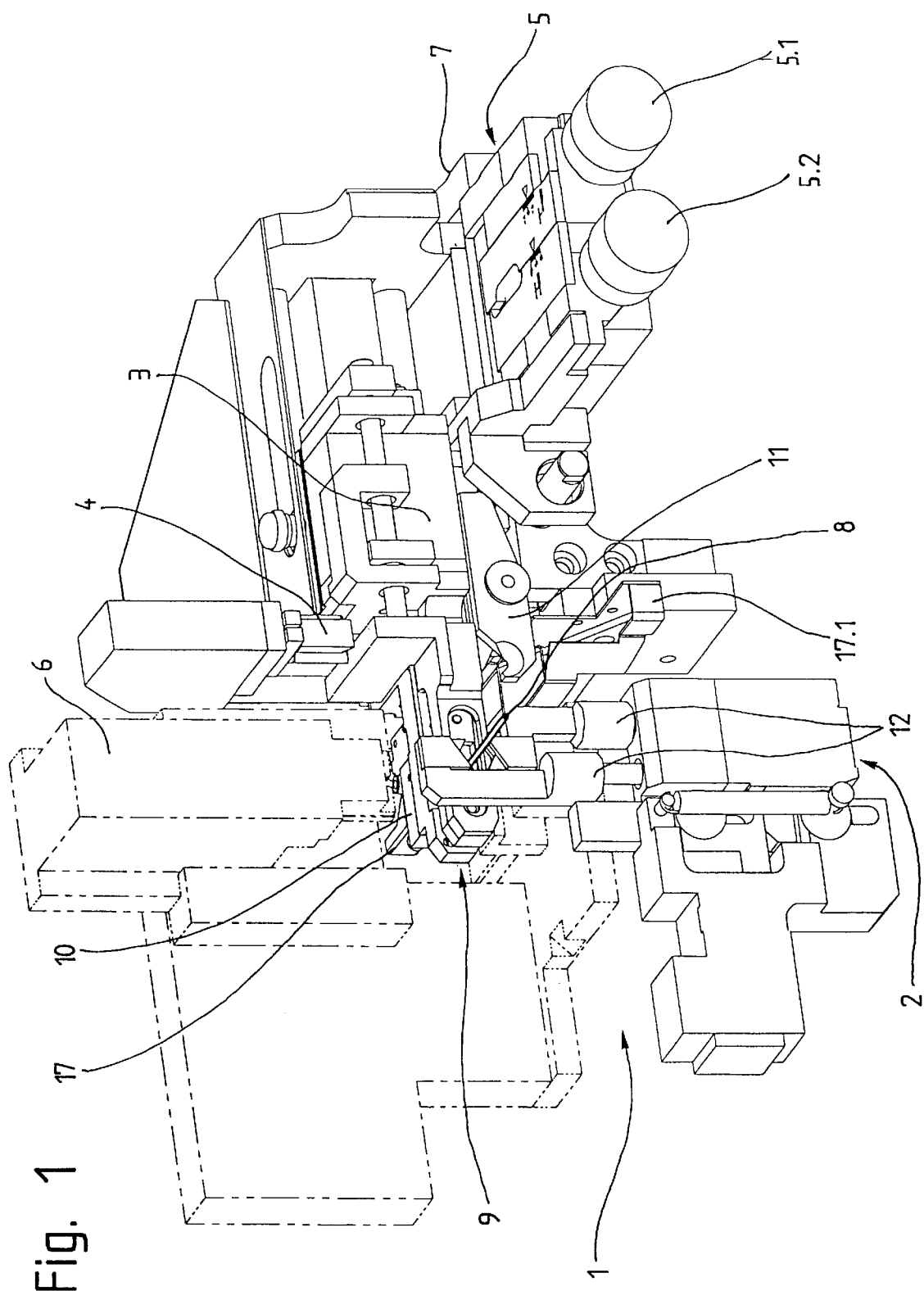
FIG. 1 shows a perspective illustration of a semi-automated production unit.

A production unit which is for cable ends and which essentially cuts down the cable ends, strips them of insulation and connects contacts by means of crimp connections is designated by 1 in FIGS. 1 to 11. The production unit consists of for example, the subassemblies of a gripper unit 2, a knife head 3, an ejector 4, an adjusting device 5 and a crimping device 6, where in the subassemblies are arranged at a housing 7. The cable end 8.1 of a cable 8 is manually advanced up to a processing region 9, wherein a release device 10 establishes the correct position of the cable end 8.1.

Figure 2:
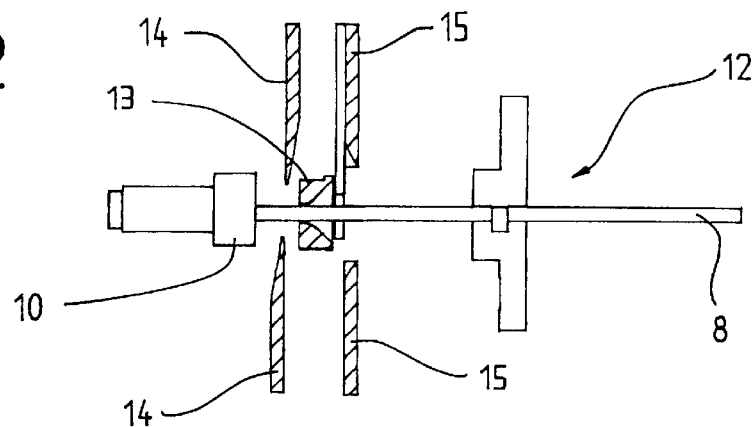
FIGS. 2 to 9 show a schematic illustration of a production process at a cable end.
Figure 3:
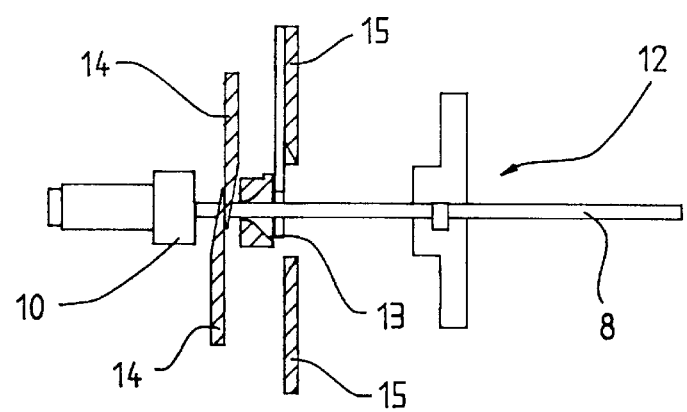
Figure 4:
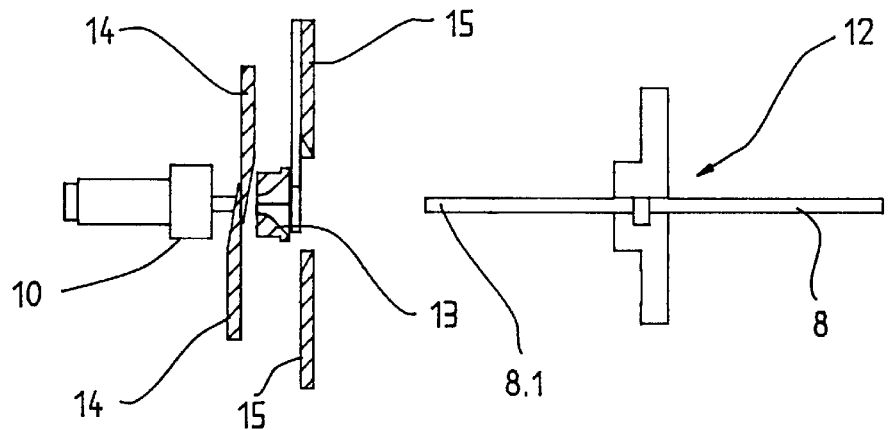
Figure 5:
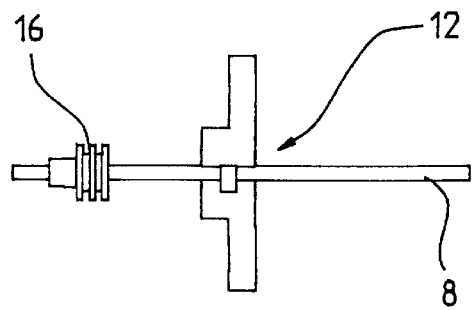
Figure 6:
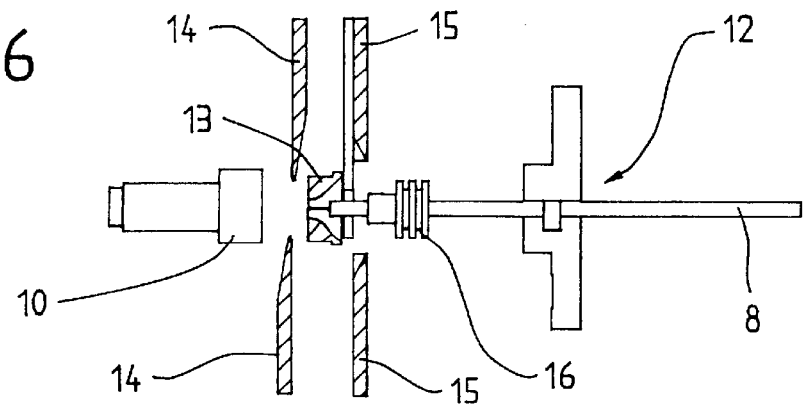
Figure 7:
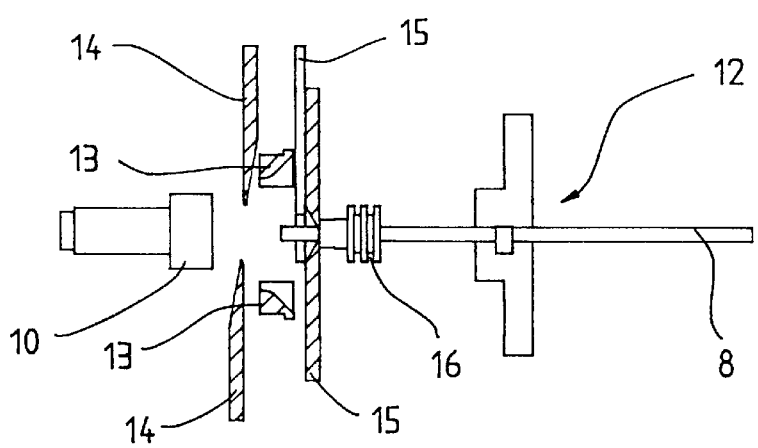
Figure 8:
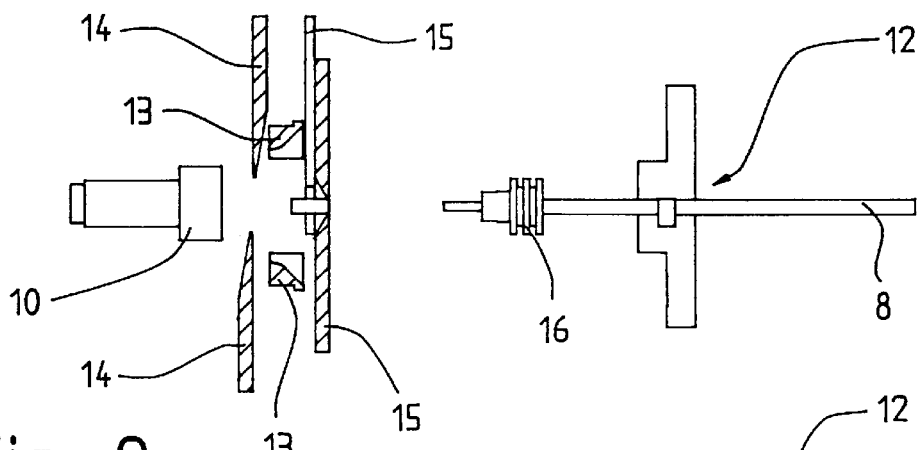
Figure 9:
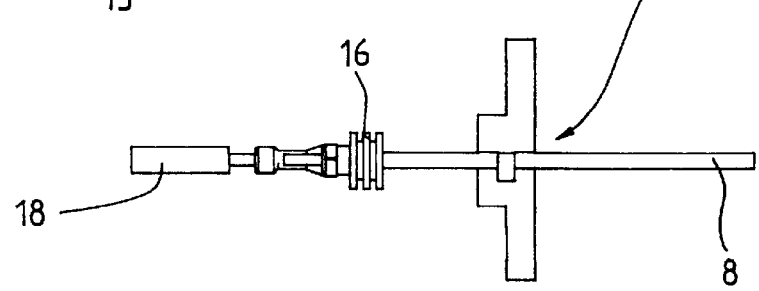

As soon as the release device 10 has fixed the cable end 8.1, the production process illustrated in FIGS. 2 to 9 begins, wherein improperly connected contacts are separated from the cable 8 by means of a contact cutter 11. The production process illustrated in FIGS. 2 to 9 is one possible production variant with trimming, equipping with sockets or nozzles, stripping of insulation and crimping. Trimming and/or equipping with sockets can, for example, also be omitted. As illustrated in FIG. 2, a cable gripper 12 of the gripper unit 2 closes as soon as the cable 8 is advanced up to the release device 10, wherein a feed-in funnel 13 facilitates the advance of the cable 8 into the processing region 9. The closed cable gripper 12 holds the cable 8 fast in all further processing steps. In FIG. 3, a separating knife 14 is closed, whereby insulation and strands of the cable end 8.1 are trimmed to the correct length predetermined by the settable position of the separating knife 14. The position of the separating knife 14 is settable by means of a first handwheel 5.1 of the adjusting device 5. The adjusting of the handwheel 5.1 causes a common displacement of the release device 10 a nd the separating knife 14, wherein the spacing between the release device 10 and the separating knife 14 remains the same. An insulation stripping knife 15 remains open during the trimming. The release device 10, the separating knife 14, the feed-in funnel 13 and the insulation stripping knife 15 are arranged at the knife head 3, which, as shown in FIG. 4, executes a pulling-off movement leading in the cable direction and away from the cable end 8.1. The knife head 3 subsequently travels to the side, whereby the ejector 4 removes the cable portion by means of a vertical movement of the knife head 3. The processing region 9 is now free for the equipping, which is shown in FIG. 5, of the cable end 8.1 with a sealing socket 16. According to FIG. 6, the knife head 3 then moves forward again up to the cable axis and in the direction of the cable axis up to the insulation stripping position, which is settable by means of a second handwheel 5.2 of the adjusting equipment 5. In FIG. 7 the insulation stripping knives 15 are closed and, as shown in FIG. 8, the cut insulation is removed from the cable 8 by means of a pulling-off movement leading in the direction of the cable 8. So that the processing region 9 also remains clean for the subsequent crimping process, a first collecting pan receives downwardly falling cut residues. The first collecting pan is formed by a pivotable collecting plate 17 and by elements of the knife head 3 and the knife blocks. Subsequently, the knife head 3 travels to the side, whereby the ejector 5 removes the insulation portion from the knife head 3 by means of a vertical movement. The processing region 9 is now free for the production. which is shown in FIG. 9, of a crimp connection, in which the crimping device 6, for example a crimping press, connects a contact 18 with the cable end 8.1 by a crimping technique.

If the crimp connection by the crimping device 6 is recognized as poor, the cable 8 is pivoted away by means of the gripper unit 2 to the right relative to the contact cutter 11 and the contact 18 is cut off approximately at the location of the portion stripped of insulation, which has the advantage that little cable waste arises and thus a reprocessing of the cable is favored. The gripper unit 2 remains in the upright setting and thus the cable in the laid-in position for all remaining processing steps.

Figure 10:
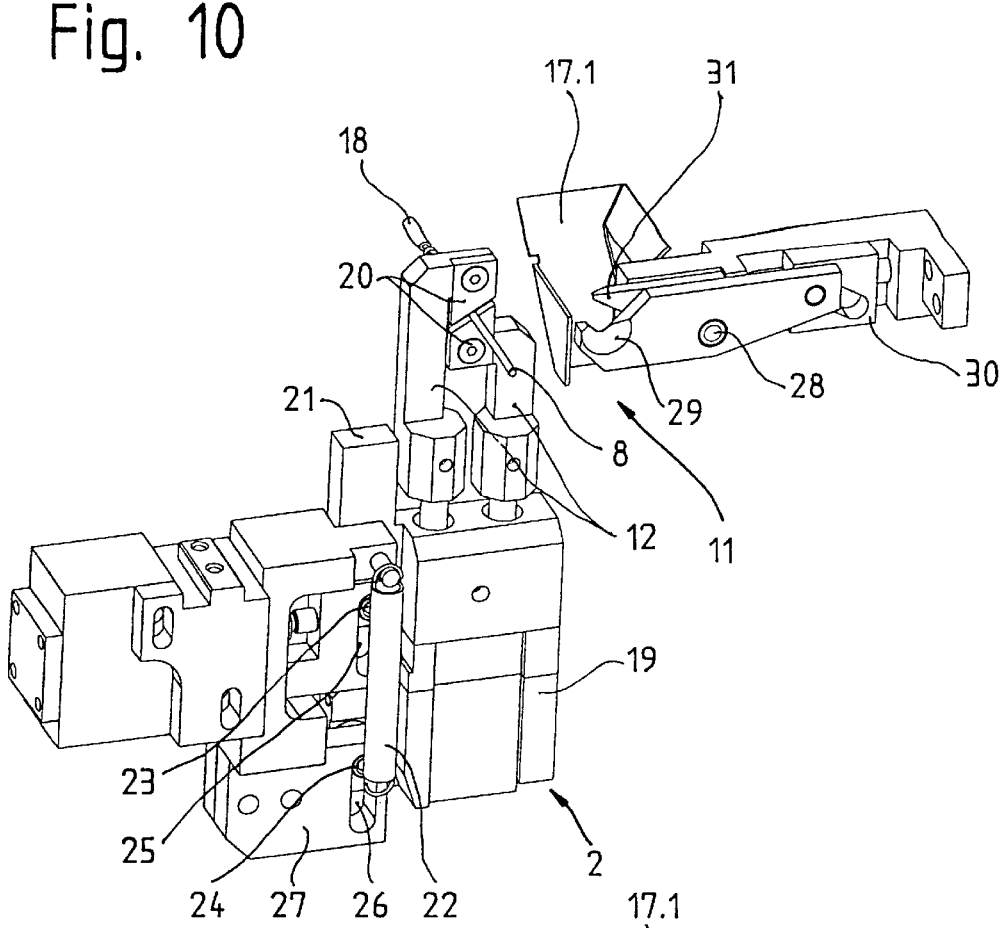
FIG. 10 shows a gripper unit with a cable in the setting during the processing procedure.

FIG. 10 shows the gripper unit 2 with a cable 8 in the position during the processing procedure. A gripper module 19 guides and drives both cable grippers 12. For the fixing of the cable 8, the two cable grippers 12 are moved until the gripper jaws 20 clamp the cable 8. During the crimping process the crimping device 6 lowers its crimping die onto the contact 18, wherein the cable end 8.1 stripped of insulation is introduced from above into the crimping zone of the contact 18. The cable 8 must accompany the lowering movement. For that purpose the crimping device 6 presses on a ram 21 of the gripper unit 2 against the spring force of a spring 22. A first pin 23 and a second pin 24 guide the gripper unit 2 along a first guide 25 and along a second guide 26, respectively, of a guide module 27. After the crimping process the crimping device 6 frees the ram 21 again and the gripper unit 2 is then lifted back into the starting position by the spring force of the spring 22.

Figure 11:
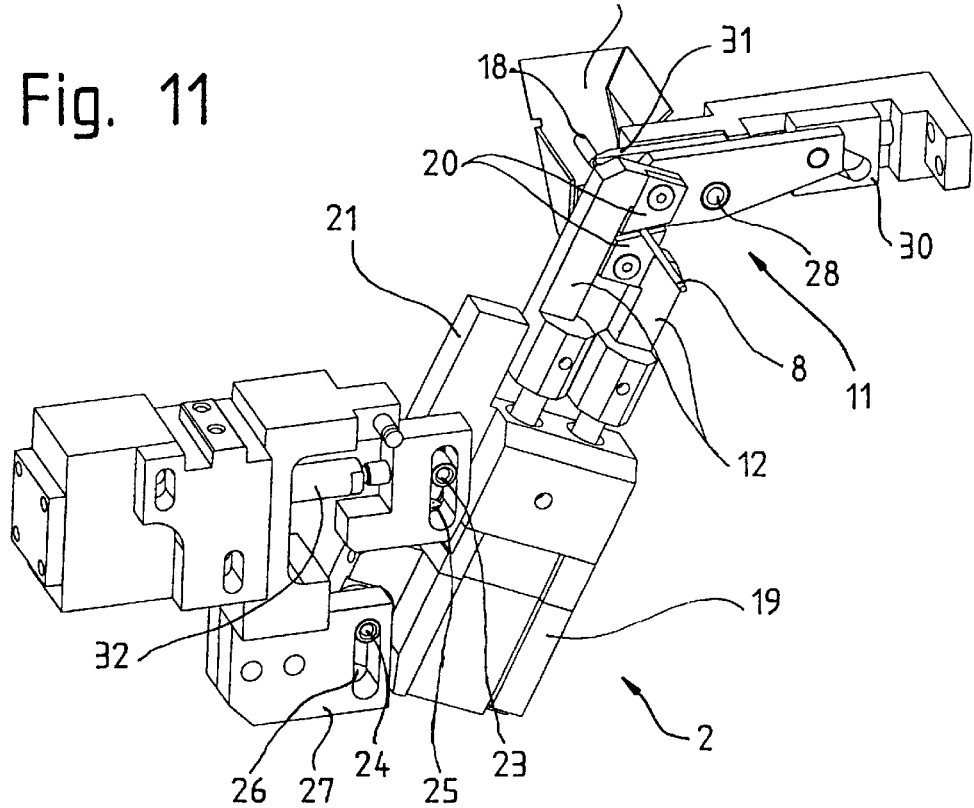
FIG. 11 shows the gripper unit in the setting for cutting off a contact from the cable with faulty crimp connection.

FIG. 11 shows the gripper unit 2 in the setting for the cutting off of a contact 18 from the cable 8 with a faulty crimp connection. The restoring spring 22 is not shown in order to provide a more easily understandable illustration. During the separating process the cable grippers 12 remain in the previous setting. The gripper module 19 is rotated by means of a drive 32 of the guide module 27 about the second pin 24 serving as an axis of rotation. Due to the rotational movement, the first pin 23 displaces slightly downwards in the first guide 25 and the cable 8 is transported from the production processing region 9 to the cutting-off processing region. As soon as the gripper module 19 has reached the end position, the improperly connected contact 18 is separated from the cable 8 by means of the contact cutter 11, wherein a knife 29, which is rotatable about an axis 28, with a knife drive 30 together with a stationary counter-knife 31 separates the contact 18 from the cable 8, which drops into the second collecting pan 17.1. Thereafter, the gripper module 19 is rotated into the starting position and the cable gripper 12 opened.

If the production unit 1 has further processing regions 9, these can also be moved to by the same rotational movement of the gripper module 19 and the cable 8 can be transported from one processing region to the other processing region.

The use of the gripper unit 2 is not restricted to either semi-automated equipment or to equipment with the aforedescribed combination of subassemblies for the production of cables 8.

The invention is not limited by the embodiments described above which are presented as examples only but can be modified in various ways within the scope of protection defined by the appended patent claims.

I claim:

1. An apparatus for making up a cable, comprising subassemblies for holding fast and processing the cable, the subassemblies including a gripper unit for holding the cable fast during processing so that the cable is transportable to at least one processing region, the gripper unit being moveable in a plane that is orthogonal to a plane containing the longitudinal axis of the cable, the gripper unit including a gripper module with cable grippers having two drivable cable gripper jaws operative to hold the cable, the subassemblies further including a crimping device operative to vertically displace the gripper module, the gripper unit further having a ram arranged so that the crimping device presses on the ram during crimping so as to lower the gripper module.

2. An apparatus according to claim 1, wherein the gripper unit includes a guide module for guiding the cable.

3. An apparatus according to claim 2, wherein the gripper module is at least one of vertically displaceable for adaptation to a processing height and rotatable about an axis for transportation of the cable.

4. An apparatus according to claim 3, wherein the guide module includes guides for the vertical displacement of the gripper module and drive means for rotating the gripper module about the axis.

5. An apparatus according to claim 3, and further comprising a force storage device that is operatively arranged to reset the gripper module.

6. An apparatus according to claim 5, wherein the force storage device is a spring.

* * * * *